US012030204B1

(12) United States Patent
Lazenby

(10) Patent No.: US 12,030,204 B1
(45) **Date of Patent: *Jul. 9, 2024**

(54) KNIFE WITH REPLACEABLE BLADE

(71) Applicant: LEATHERMAN TOOL GROUP, INC., Portland, OR (US)

(72) Inventor: Adam Lazenby, Lake Oswego, OR (US)

(73) Assignee: LEATHERMAN TOOL GROUP, INC., Portland, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 18/476,458

(22) Filed: Sep. 28, 2023

Related U.S. Application Data

(63) Continuation of application No. 18/164,381, filed on Feb. 3, 2023.

(51) Int. Cl.
*B26B 5/00* (2006.01)
*B26B 11/00* (2006.01)
*B25B 7/22* (2006.01)

(52) U.S. Cl.
CPC .............. *B26B 5/00* (2013.01); *B26B 11/001* (2013.01); *B25B 7/22* (2013.01); *B26B 11/003* (2013.01)

(58) Field of Classification Search
None
See application file for complete search history.

(56) References Cited

U.S. PATENT DOCUMENTS

| | | | | |
|---|---|---|---|---|
| 3,851,986 A * | 12/1974 | Daughtry | B26B 1/046 403/373 |
| 4,425,709 A | 1/1984 | Quenzi | |
| 5,661,908 A * | 9/1997 | Chen | B23D 51/03 30/519 |
| 7,380,341 B2 * | 6/2008 | Ping | B26B 5/00 30/155 |
| 8,468,701 B1 * | 6/2013 | Perez | B26B 1/046 30/161 |
| 2008/0086822 A1 * | 4/2008 | Elsener | B26B 11/001 7/118 |
| 2009/0217536 A1 * | 9/2009 | Medhurst | B26B 5/00 30/337 |
| 2017/0348863 A1 | 12/2017 | Kommer et al. | |
| 2022/0134583 A1 | 5/2022 | Sung | |
| 2022/0339805 A1 * | 10/2022 | Kao | B26B 1/042 |
| 2022/0388185 A1 | 12/2022 | Dudley | |

OTHER PUBLICATIONS

International Search Report and Written Opinion for International Application No. PCT/US2023/083164 (ISA/EP) mailed Mar. 15, 2024 (13 pages).

* cited by examiner

*Primary Examiner* — Hwei-Siu C Payer
(74) *Attorney, Agent, or Firm* — ALSTON & BIRD LLP

(57) ABSTRACT

A knife is provided having an interchangeable and replaceable blade. A knife may include: a knife base defining a base protrusion and a base recess; a replaceable knife blade defining a blade protrusion and a blade recess; and a fastener, wherein the knife base is held fixed relative to the replaceable knife blade in a plane along which the replaceable knife blade extends in response to the base protrusion engaging the blade recess and the blade protrusion engaging the base recess; and where the knife is held fixed relative to the replaceable knife blade in an axis orthogonal to the plane of the replaceable knife blade by the fastener securing the knife base to the replaceable knife blade.

17 Claims, 12 Drawing Sheets

KNIFE WITH REPLACEABLE BLADE

CROSS-REFERENCE TO RELATED APPLICATIONS

This application is a continuation of and claims priority to U.S. patent application Ser. No. 18/164,381, filed on Feb. 3, 2023, the contents of which are hereby incorporated by reference in their entirety.

TECHNOLOGICAL FIELD

An example embodiment relates generally to a knife, and more particularly, to a knife with a replaceable blade.

BACKGROUND

Knives are a fundamentally important tool that have a wide variety of applications. Knives are available in a variety of sizes and types for different applications. However, all knives generally function to cut objects or material. Specific knife configurations are designed according to their purpose. All knives suffer from wear with use. Knives become dull over time. Many knives can be sharpened through a process that uses abrasive material to remove material from the knife blade in shaping a cutting edge of the blade according to the cutting purpose. Since sharpening employs an abrasive and creates material removal, sharpening reduces the size and alters the shape of a knife blade over time.

BRIEF SUMMARY

Provided herein are embodiments generally relating to a knife, and more particularly, to a knife with a replaceable blade. Embodiments provided herein include a knife including: a knife base defining a base protrusion and a base recess; a replaceable knife blade defining a blade protrusion and a blade recess; and a fastener, wherein the knife base is held fixed relative to the replaceable knife blade in a plane along which the replaceable knife blade extends in response to the base protrusion engaging the blade recess and the blade protrusion engaging the base recess; and where the knife is held fixed relative to the replaceable knife blade in an axis orthogonal to the plane of the replaceable knife blade by the fastener securing the knife base to the replaceable knife blade. The knife base of an example embodiment defines a fastener hole, where the replaceable knife blade defines an edge, and where the fastener passes through the fastener hole and presses the edge of the replaceable knife blade against the knife base. The replaceable knife blade of an example embodiment defines a flange, where the knife base defines a recess, and where the fastener holds the flange against the recess. The knife base an example embodiment is attached to a handle. The fastener of an example embodiment is an axial fastener. The replaceable knife blade of an example embodiment is interchangeable with one or more other knife blades of different knife blade profiles. According to some embodiments, the fastener is a first fastener, the knife further including a second fastener, where the knife base is held fixed relative to the replaceable knife blade in the axis orthogonal to the plane of the replaceable knife blade by the first fastener and the second fastener securing the knife base to the replaceable knife blade.

Embodiments provided herein include: a knife base; a replaceable knife blade; and a fastener, where the knife base defines a first part of an interlocking profile, where the replaceable knife blade defines a second part of an interlocking profile, where the second part of the interlocking profile fits within the first part of the interlocking profile, and where movement of the knife blade relative to the knife base is precluded in a plane along which the replaceable knife blade extends in response to the second part of the interlocking profile engaging within the first part of the interlocking profile.

According to some embodiments the knife includes a fastener, where the fastener secures the second part of the interlocking profile within the first part of the interlocking profile. The fastener of an example embodiment precludes relative movement between the knife base and the replaceable knife blade. The knife base of an example embodiment defines a hole, where the replaceable knife blade defines an edge, and where the fastener passes through the fastener hole and presses the edge of the replaceable knife blade toward the knife base. According to certain embodiments, the first part of the interlocking profile includes a series of curvatures, where the second part of the interlocking profile includes a series of curvatures complementary to the series of curvatures of the first part of the interlocking profile. According to some embodiments, the first part of the interlocking profile defines a recess, where the second part of the interlocking profile defines a flange, and where the flange engages the recess in response to the first part of the interlocking profile engaging within the first part of the interlocking profile. The flange of an example embodiment precludes the second part of the interlocking profile from passing through the first part of the interlocking profile.

Embodiments provided herein include a method for replacing a knife blade including: inserting a second part of an interlocking profile of a replaceable knife blade into a first part of an interlocking profile of a knife base along a direction orthogonal to an axis extending through a major surface of the blade; inserting a fastener through a fastener hole defined within the knife base; and tightening the fastener, where a flange of the fastener engages an edge of the replaceable knife blade and drives the second part of the interlocking profile into the first part of the interlocking profile.

BRIEF DESCRIPTION OF THE DRAWINGS

Figure 1:
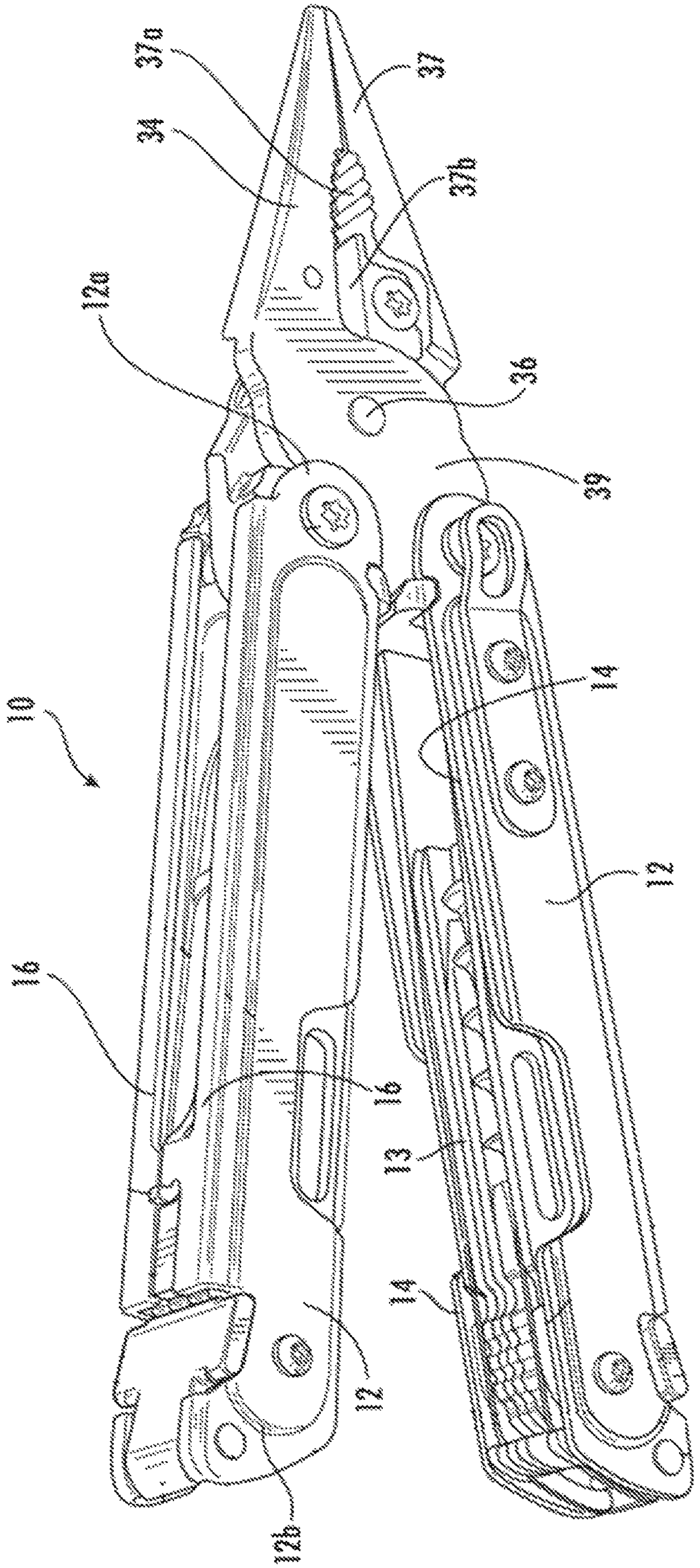
Figure 2:
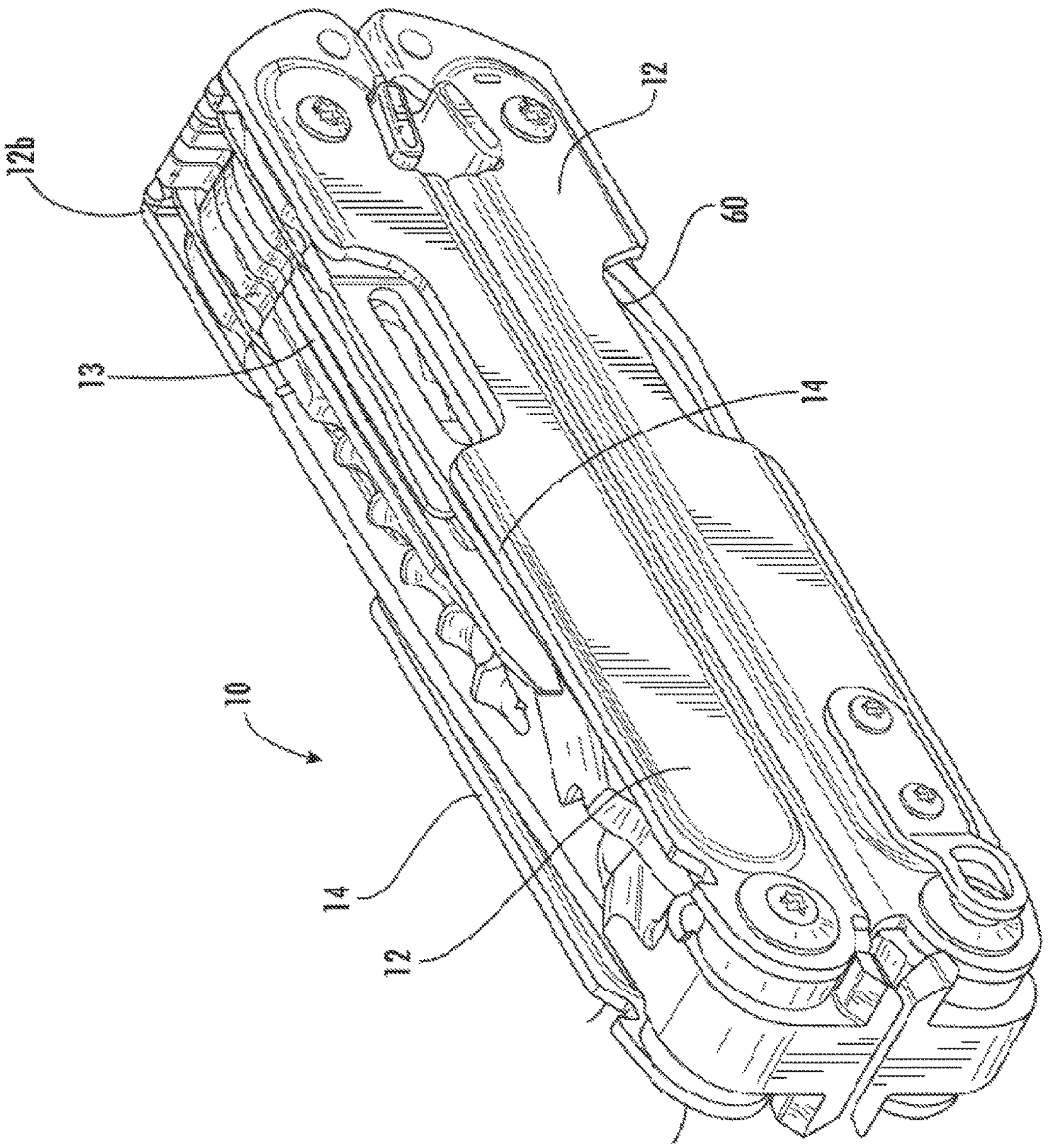
Figure 3:
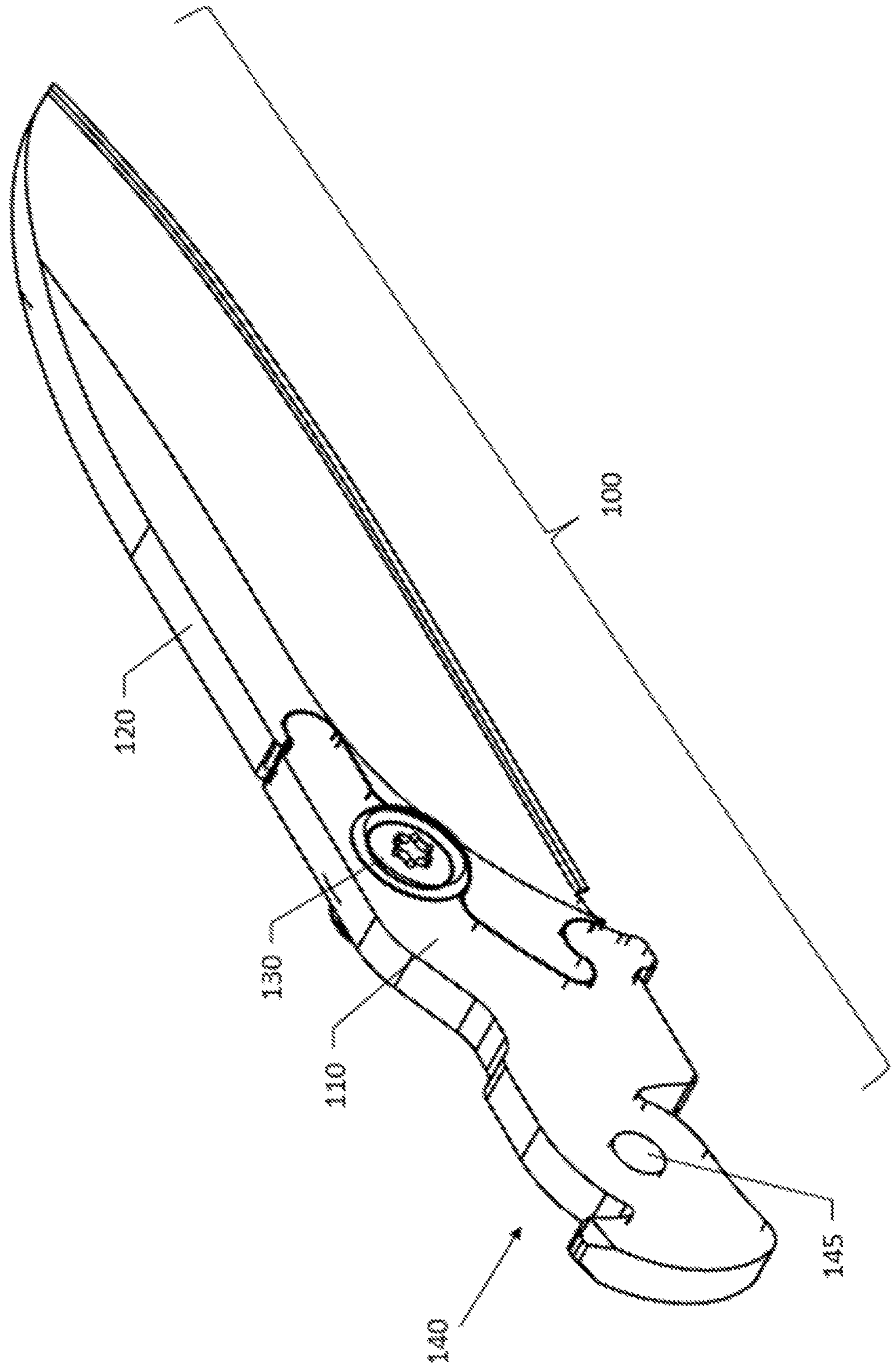
Figure 4:
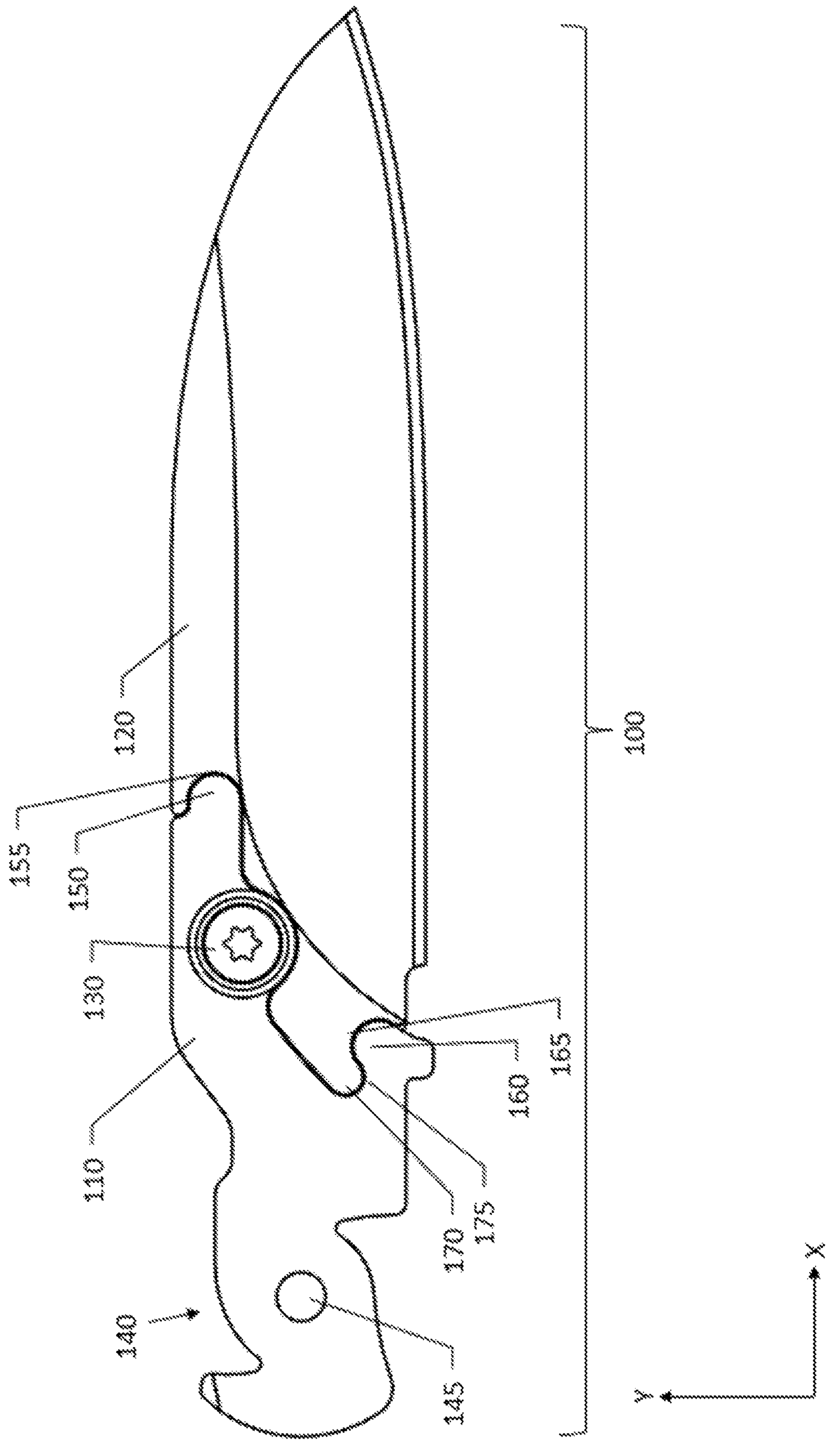
Figure 5:
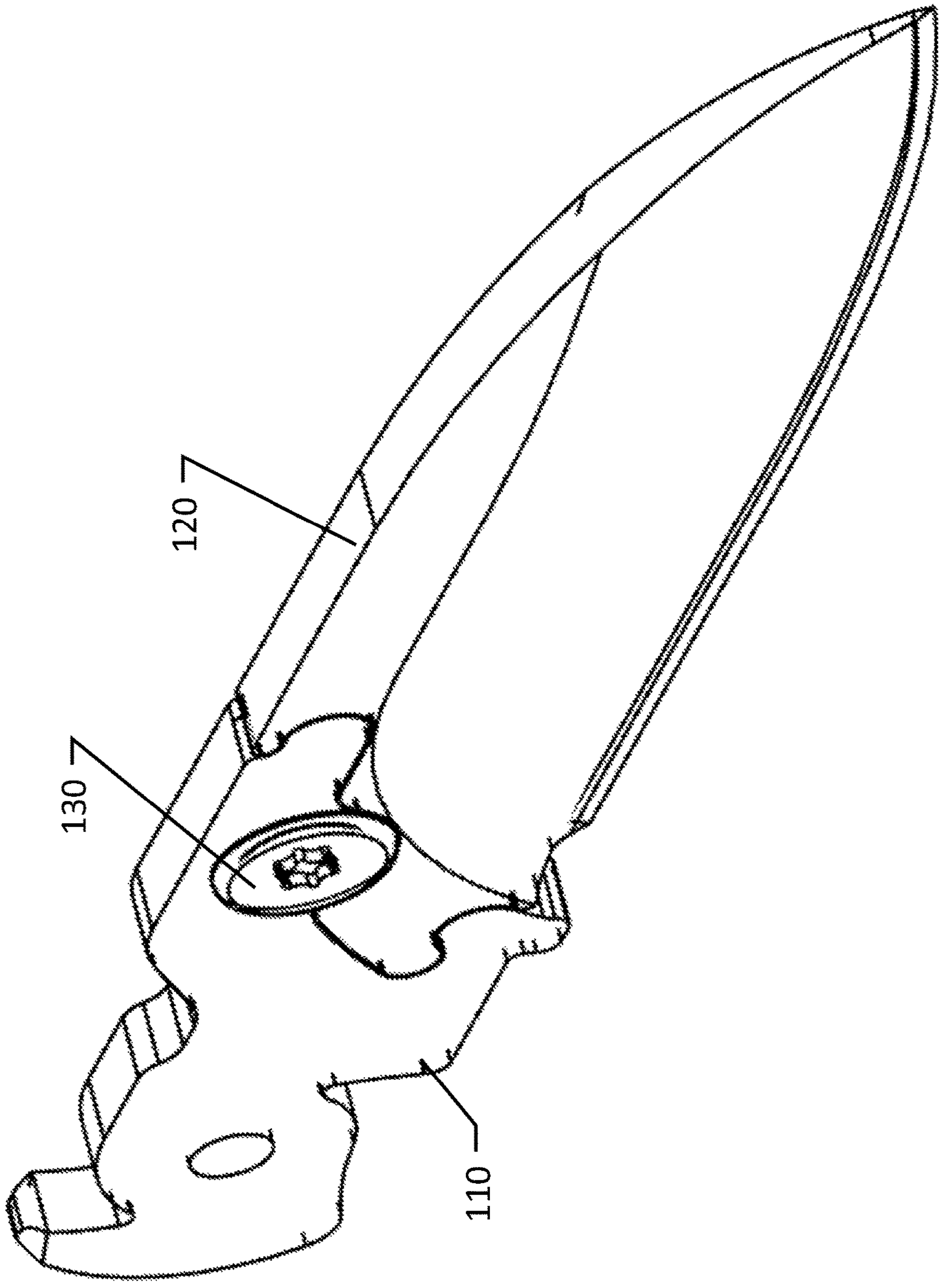
Figure 6:
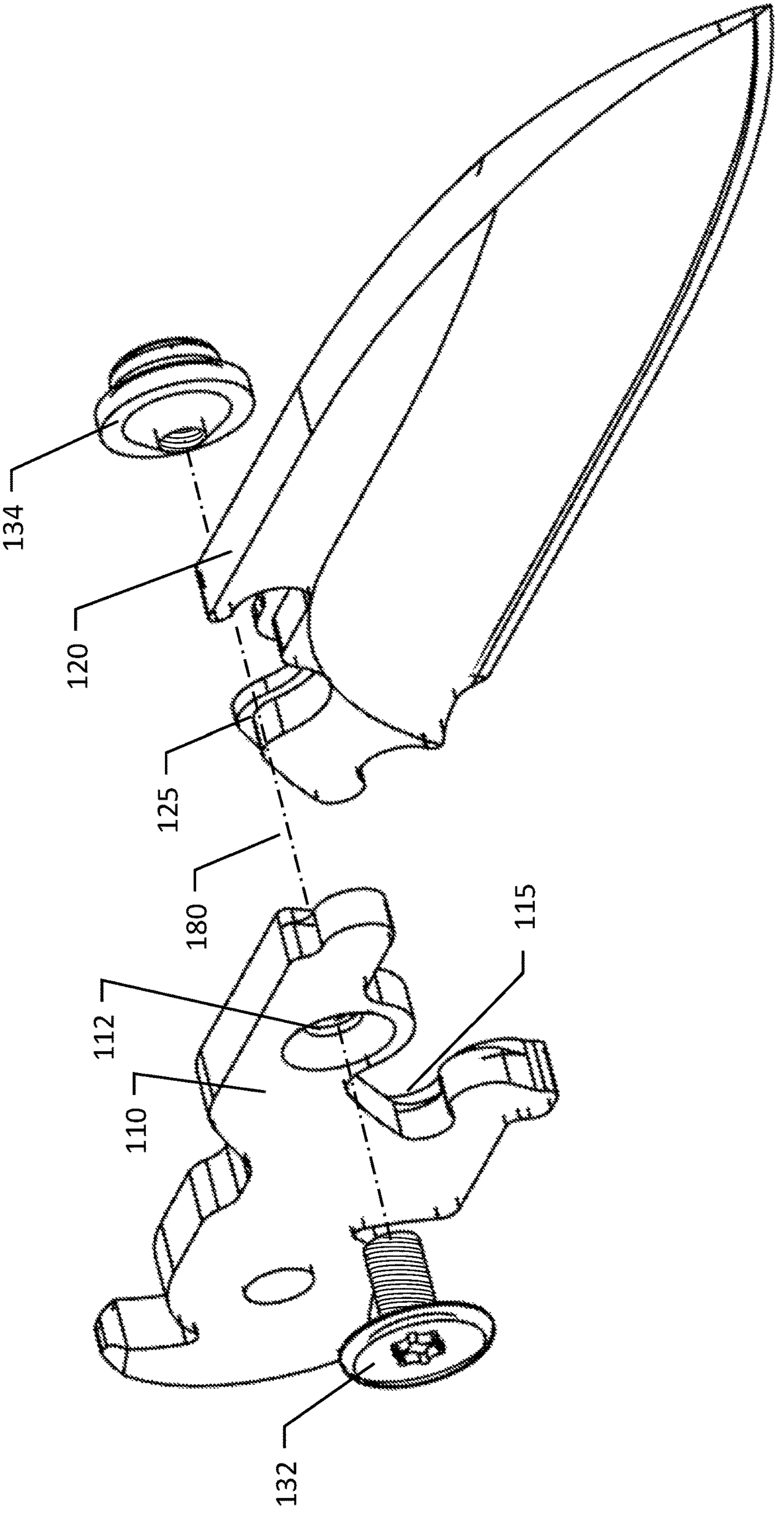
Figure 7:
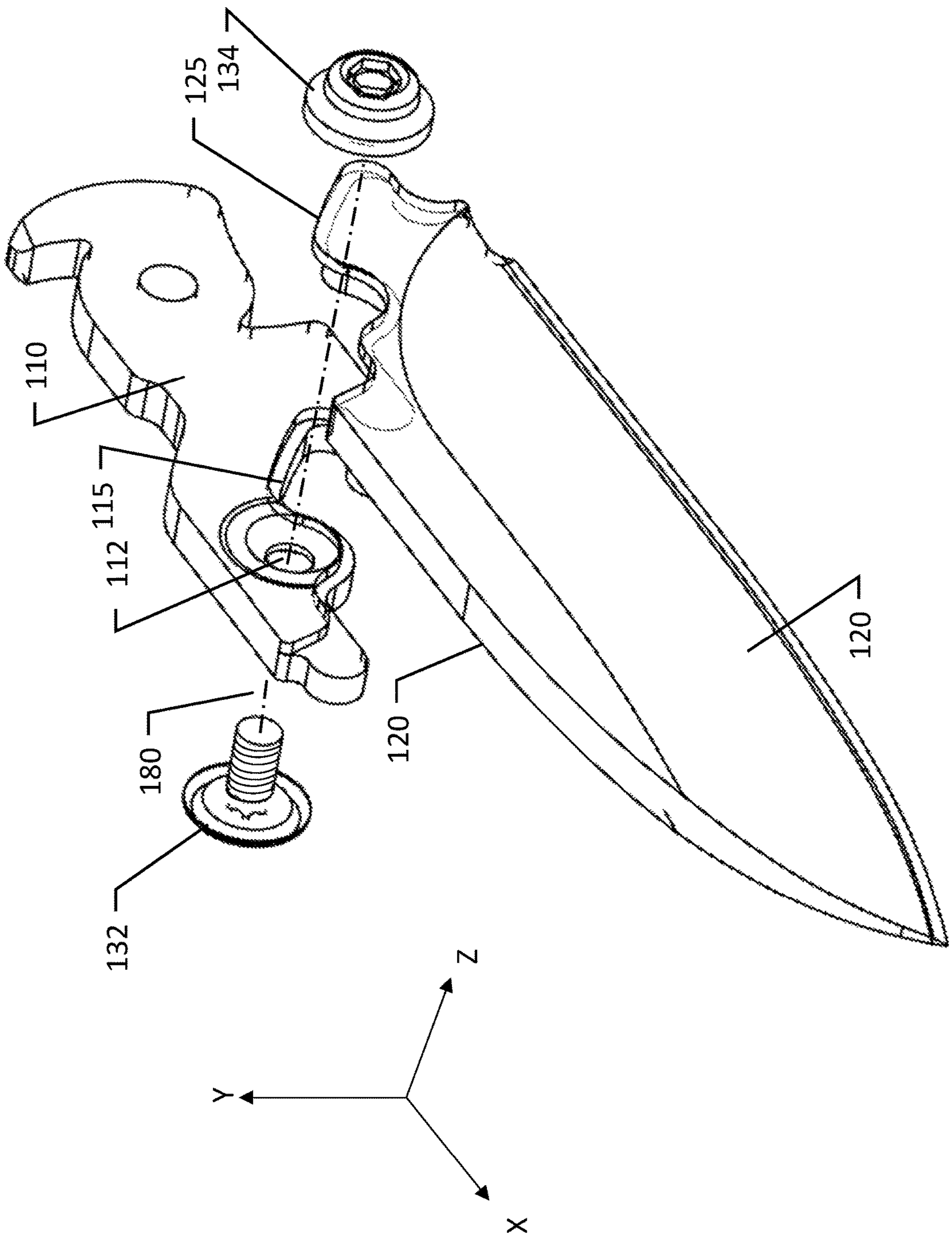
Figure 8:
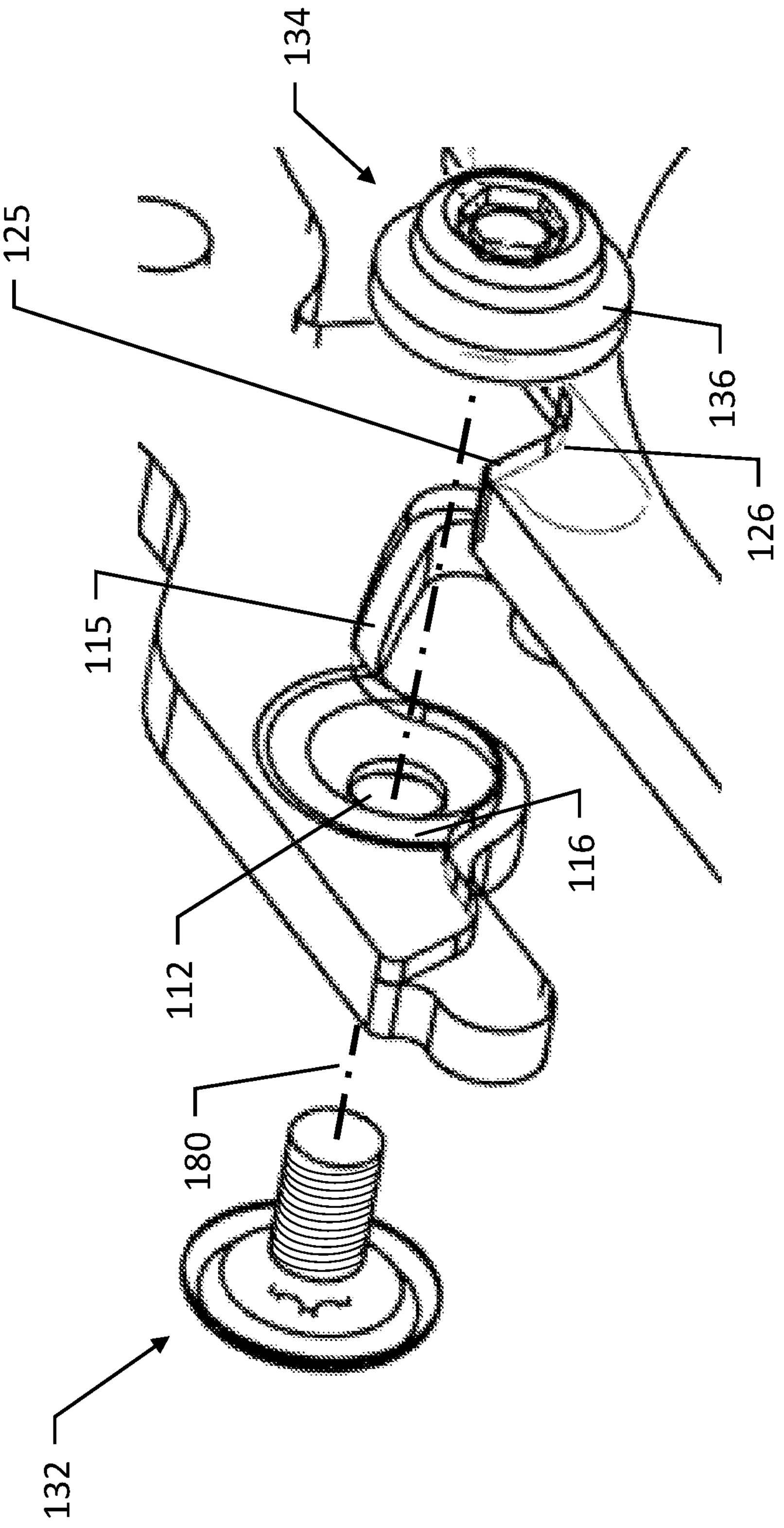
Figure 9:
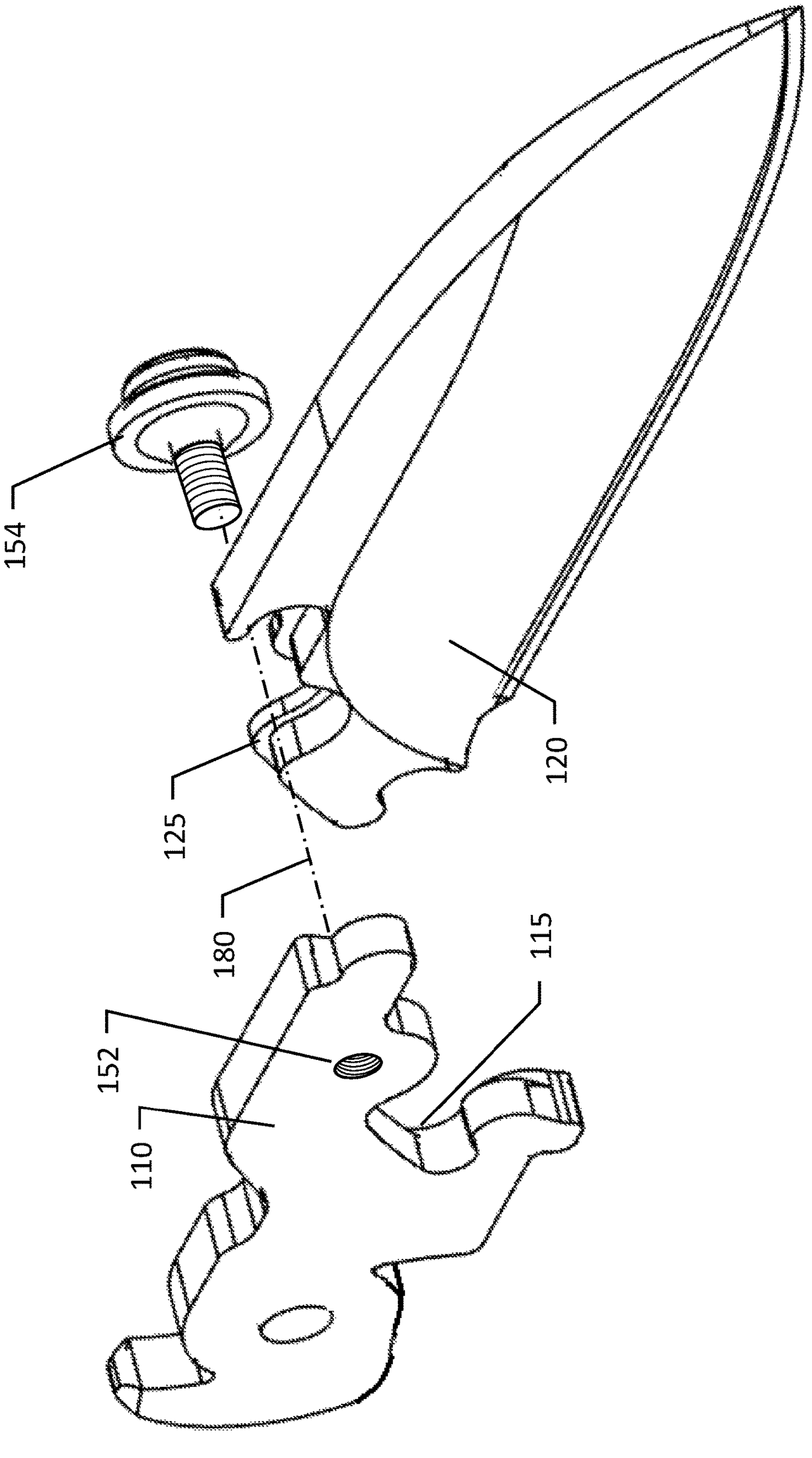
Figure 10:
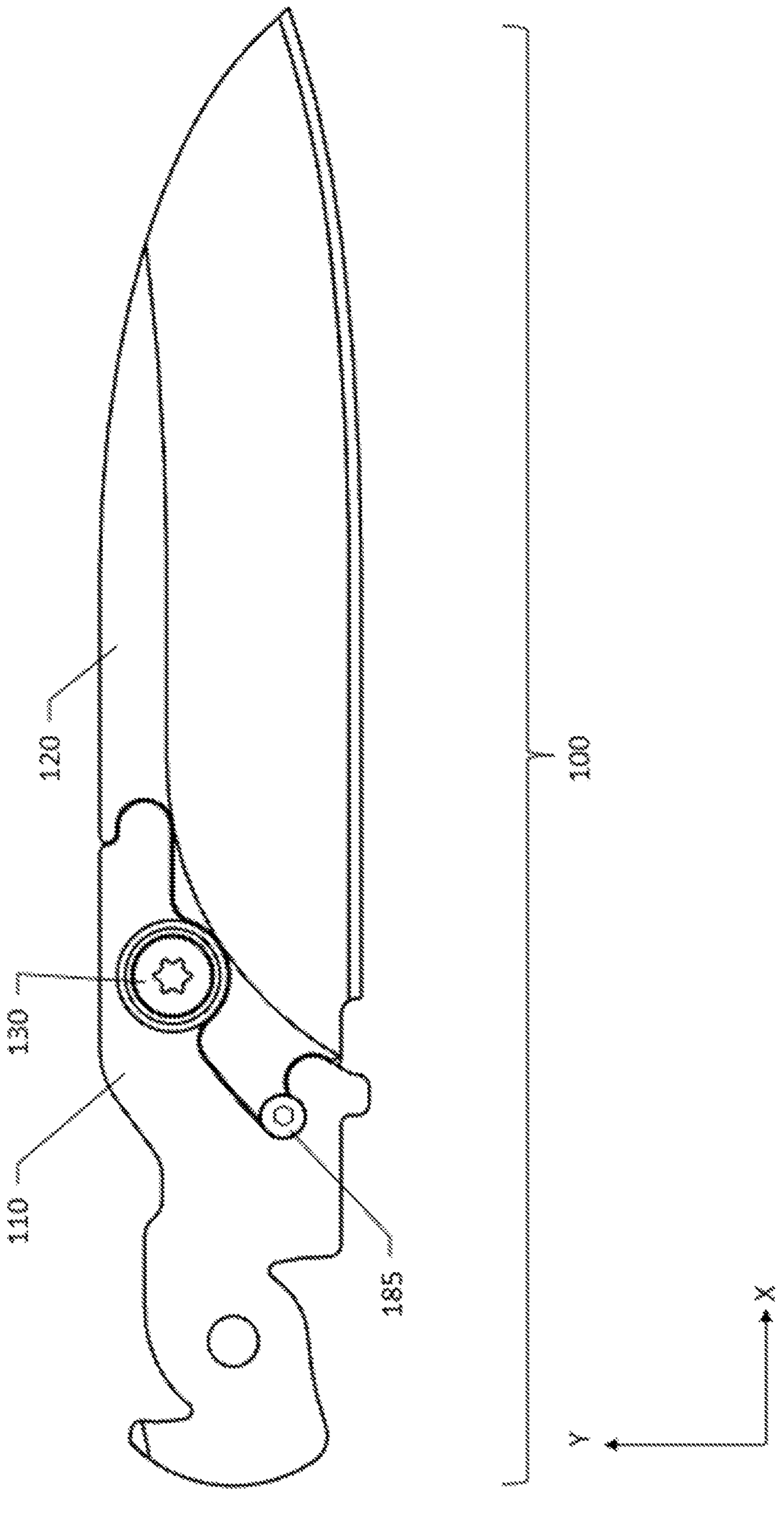
Figure 11:
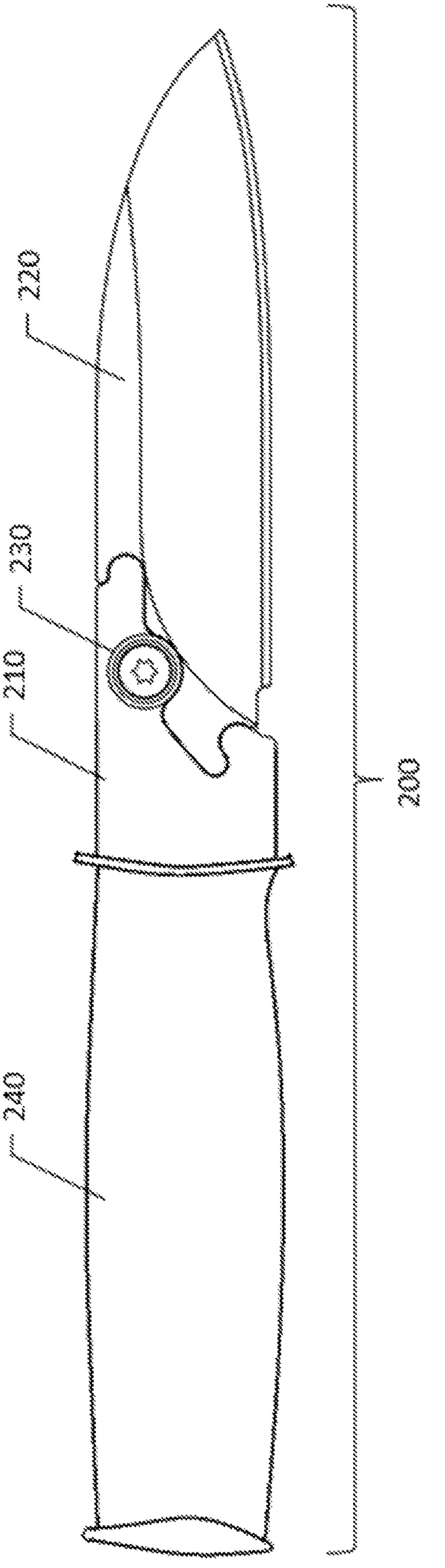
Figure 12:
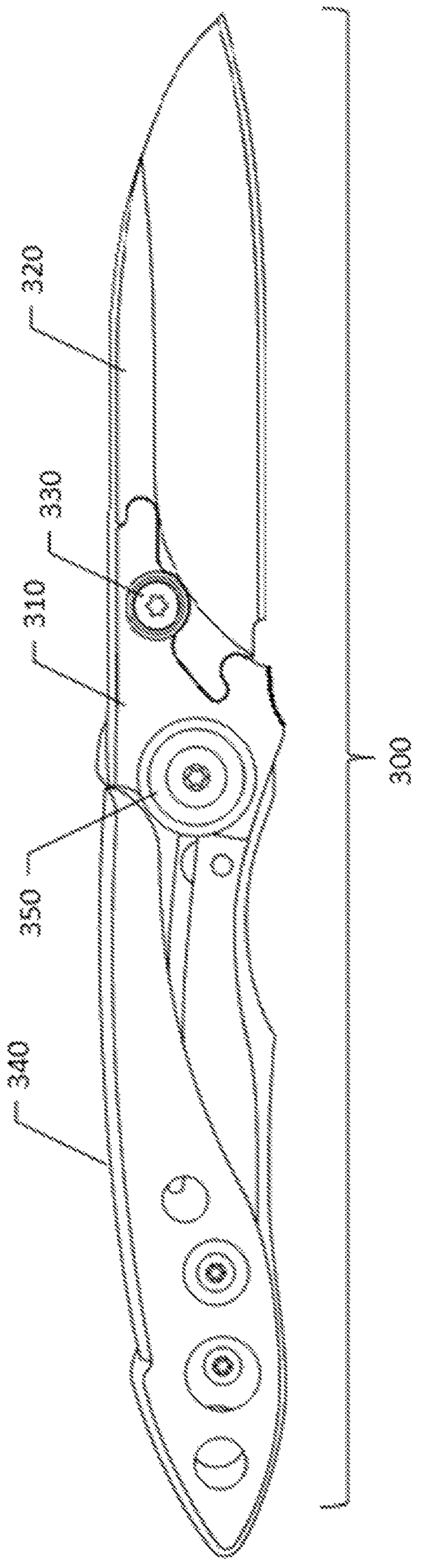

Having thus described embodiments of the invention in general terms, reference will now be made to the accompanying drawings, which are not necessarily drawn to scale, and wherein:

FIG. 1 is a perspective view of a multipurpose tool in accordance with an example embodiment of the present disclosure in which the multipurpose tool is in the open position;

FIG. 2 is a perspective view of a multipurpose tool in accordance with an example embodiment of the present disclosure in which the multipurpose tool is in the closed position;

FIG. 3 illustrates a knife including a knife base, replaceable knife blade, and a fastener according to an example embodiment of the present disclosure;

FIG. 4 illustrates a profile view of the knife of FIG. 3 depicting engagement features between the replaceable knife blade and the knife base;

FIG. 5 illustrates another view of the knife of FIG. 3 according to an example embodiment of the present disclosure;

FIG. 6 illustrates an exploded view of the knife from the same perspective as FIG. 5 according to an example embodiment of the present disclosure;

FIG. 7 illustrates the exploded view of FIG. 6 from a different perspective according to an example embodiment of the present disclosure;

FIG. 8 illustrates an enlarged view of the fastener including the first fastener element and the second fastener element according to an example embodiment of the present disclosure;

FIG. 9 illustrates an exploded view of the knife employing a fastener and threaded fastener hole in the knife base according to an example embodiment of the present disclosure;

FIG. 10 illustrates a profile view of a knife including a secondary fastener between the knife blade and the knife base according to an example embodiment of the present disclosure;

FIG. 11 illustrates a knife with a replaceable knife blade including a handle according to an example embodiment of the present disclosure; and FIG. 12 illustrates a folding knife with a replaceable blade knife according to an example embodiment of the present disclosure.

DETAILED DESCRIPTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Embodiments described herein relate to knives, and more specifically, knives with replaceable blades. Conventional knifes may be designed for specific uses, such as paring knives, bread knives, filet knives, survival knives, etc. Typically, each of these knives is a separate, stand-alone tool with a fixed handle and blade. As these knives wear, they can be resharpened until such time as there is insufficient blade material remaining for practical use at which point the knife is generally replaced. However, when a knife is a component of a tool that has multiple functions, or when a knife blade extends from a handle of value (inherent or sentimental), it is desirable to make the knife blade replaceable such that wearing of the blade does not adversely affect the overall tool or the handle.

Embodiments provided herein include a replaceable knife blade that securely attaches to a knife base that enables easy replacement while providing a secure and stable fixation between the knife blade and the knife base. The knife base of example embodiments is attached to or part of a handle or a tool and provides a secure, stable connection between the knife blade and the handle or tool. An example embodiment of a tool in which a knife is a valuable component, but not a sole component is a multipurpose tool.

Referring now to FIGS. 1 and 2, a multipurpose tool 10 according to an example embodiment is depicted. While the tool will be described in the context of a multipurpose tool, other types of tools or handles may readily employ components of embodiments of the present disclosure. For purposes of illustration, but not of limitation, however, a multipurpose tool employing embodiments of the present invention will now be described.

The multipurpose tool 10 of the illustrated embodiment includes a plurality of handles 12, such as first and second handles, configured for movement relative to one another, as well as a plurality of tool members 13 carried by at least one of the handles. Typically a multipurpose tool includes a pair of generally elongate handles that extend in a lengthwise or longitudinal direction between opposed ends, such as a proximate end 12*a* and a distal end 12*b*. As a result of their connection, such as a pivotal connection, to one another and/or to one or more of the tool members, the handles can be moved toward and away from one another, such as to actuate a tool member as described below.

In this regard, the multipurpose tool 10 may be configured such that the handles 12 are adapted for relative movement between an open position as shown in FIG. 1 and a closed position as shown in FIG. 2. As will be apparent, the multipurpose tool has a compact form factor in the closed position to facilitate transport and storage of the multipurpose tool. One or more tool members carried by the multipurpose tool are generally accessible while the multipurpose tool is in the closed position. While the multipurpose tool is more expansive in the open position with the handles rotated so as to be further apart from one another, one or more different tool members of the multipurpose tool may be accessible and capable of being utilized in the open position, even though those same tool members(s) are stowed and generally inaccessible in the closed position.

Each handle 12 includes a pair of opposed sidewalls 14, such as first and second opposed sidewalls. The sidewalls are spaced apart from one another so as to define a channel within the handle to receive and store a plurality of tool members 13. In an example embodiment, the handle also includes a floor 16 extending from at least the first sidewall toward the second sidewall. As such, each handle has a cross-section that is generally U-shaped, such as defined by the opposed sidewalls and the floor that extends at least partially therebetween.

The multipurpose tool 10 of an example embodiment depicted in FIGS. 1 and 2 includes a tool member in the form of jaws 34 that are pivotally connected to one another, such as at a pivot point 36. Each jaw includes a working surface 37 extending in one direction from the pivot point and a base member 39 extending in an opposite direction from the pivot point. The jaws may include different types of working surfaces depending upon the tool function, such as a ribbed surface 37*a* in which the jaws comprise a pair of pliers and/or a blade or cutting surface 37*b* in which the jaws comprise a wire cutter.

The multipurpose tool 10 of FIGS. 1 and 2 is merely an example of embodiments that benefit from the knife with a replaceable knife blade as described herein. The various folding tools within such a multipurpose tool can include one or more knives. Such a knife is illustrated in FIG. 3, which depicts a knife 100 including a knife base 110, replaceable knife blade 120, and fastener 130. The illustrated embodiment, configured for use as a foldable tool within a multitool, also includes an attachment portion 140 with through hole 145 defining an axis about which the knife 100 rotates with respect to the multitool.

FIG. 4 illustrates a profile view of the knife 100 having a replaceable knife blade 120. The knife base 110 defines a first part of an interlocking profile including a series of protrusions and recesses, while the replaceable knife blade 120 defines a complementary series of protrusions and recesses as a second part of the interlocking profile. As shown, the knife base 110 includes a first protrusion 150 and a second protrusion 160, while the replaceable knife blade 120 includes corresponding complementary first recess 155 and second recess 165, respectively. The replaceable knife blade 120 further includes a third protrusion 170 with the knife base 110 including a corresponding complementary third recess 175. While the illustrated embodiment includes three protrusions and corresponding recesses, one or ordinary skill in the art would appreciate that more or fewer of these complementary structures can be used. The protrusions engage corresponding recesses to hold the replaceable knife blade 120 fixed relative to the knife base 110 along the X-axis and Y-axis as defined in FIG. 4 in the plane of the replaceable knife blade 120. This locks the replaceable knife blade in the X-Y plane which extends through a major surface of the blade.

Securing the replaceable knife blade 120 to the knife base 110 is essential for proper operation of the knife 100. Movement of the knife blade relative to the base is undesirable and can reduce the effectiveness of the knife blade. While the series of protrusions and recesses help fix the replaceable knife blade 120 relative to the knife base 110 in two perpendicular axes, the blade must also be secured in a third axis, orthogonal to the X-axis and Y-axis. Fastener 130 facilitates this fixation in the Z-direction together with a flange or series of tabs as detailed further below.

FIG. 5 illustrates another view of the knife including the replaceable knife blade 120 and knife base 110 secured together by fastener 130. FIG. 6 illustrates an exploded view of the knife from the same perspective as FIG. 5. As shown, the fastener 130 is separated into a first fastener element 132 and a second fastener element 134, while the replaceable knife blade 120 is separated from the knife base. Also visible is a flange 125 of the replaceable knife blade 120 and a corresponding recess 115 of the knife base 110. The replaceable knife blade 120 is engaged and disengaged with the knife base 110 through movement along fastener axis 180 when the fastener 130 is not secured. When the replaceable knife blade 120 is engaged with the knife base 110, the flange 125 engages the corresponding recess 115, thereby precluding movement of the replaceable knife blade through the knife base 110. When the fastener 130 engages through the fastener hole 112 of the knife base 110 while the replaceable knife blade 120 is attached to the knife base 110, the replaceable knife blade becomes fixed relative to the knife base along all axes.

FIG. 7 illustrates the exploded view of FIG. 6 from a different perspective. As shown, the recess 115 of the knife base 110 is clearly depicted, with the flange 125 of the replaceable knife blade 120 that engages the recess. Upon assembly of the replaceable knife blade 120 with the knife base 110, the replaceable knife blade 120 and the knife base become fixed relative to one another along the X-axis and Y-axis by virtue of the protrusions and recesses described above with respect to FIG. 4. Upon securing the fastener 130 to the knife base 110, the replaceable knife blade 120 becomes fixed relative to the knife base along the Z-axis, parallel to the fastener axis 180 along which the fastener provides axial compression between the replaceable knife blade 120 and the knife base 110. The fastener 130 drives the flange 125 into engagement with the recess 115, providing additional structural engagement between the replaceable knife blade 120 and the knife base 110.

FIG. 8 illustrates an enlarged view of the fastener including the first fastener element 132 and the second fastener element 134. As shown, the first fastener element engages the second fastener element along fastener axis 180 to secure the fastener 130 through the fastener hole 112. The second fastener element includes a flange 136 that presses an edge 126 of the replaceable knife blade 120 against the knife base 110, forcing the flange 125 into engagement with the recess 115. The flange 136 of the second fastener element 134, when fastened to the first fastener element 132, is seated against the edge 126 and a flange 116 of the knife base 110. The fastener 130 can include any type of axial fastener, such as a fastener with a male threaded portion engaging a female threaded portion to draw together the replaceable knife blade 120 and the knife base 110 and to secure them together.

The fastener of the above-described embodiment includes a two-part fastener received through a fastener hole 112. However, embodiments described herein can optionally employ a single fastener, such as threaded fastener 154 of FIG. 9, received within a threaded fastener hole 152. The threaded fastener 154 provides the same functionality as the fastener described above with respect to FIGS. 6-8; however, the overall width of the assembly including the knife blade 120, knife base 110, and threaded fastener 154 can be reduced, which is of particular benefit when the knife is used in a multipurpose tool as described in an example embodiment above.

FIG. 10 illustrates a profile view of the knife 100 having a replaceable knife blade 120 similar to that shown in FIG. 4. However, the embodiment shown in FIG. 10 includes a secondary fastener 185. The secondary fastener 185 can be used to further secure the knife blade 120 to the knife base 110. The secondary fastener 185 can be a two-piece fastener as described above with respect to FIGS. 6-8, or a one-piece fastener received within a threaded fastener hole as described above with respect to FIG. 9. The secondary fastener can provide additional strength to the attachment between the knife blade 120 and the knife base 110.

As noted above, secure engagement between the knife base or a handle and the replaceable knife blade is critical for safety and functionality. The replaceable knife blade of example embodiments described herein can be used to swap out a dull blade for a sharp blade. Optionally, other knife types can be interchangeable using the aforementioned interface between the replaceable knife blade 120 and the knife base 110. Examples of other types of knives that can be interchangeable using the interface include, but are not limited to, a serrated knife, a saw-type knife, a semi-serrated knife, a knife of a different material (e.g., titanium nitride coated blade, a blade with high carbon content, a hardened blade, etc.), a double-edged knife, or the like.

While the illustrated embodiment of FIGS. 1-10 illustrates example embodiments implemented in a multitool or in a folding knife configuration, embodiments can optionally be implemented in a knife with a handle, as depicted in FIG. 11. As shown, the knife 200 includes the replaceable knife blade 220, the knife base 210, and the fastener 230, where the knife base 210 extends from knife handle 240. In such an embodiment, the replaceable knife blade 220 can be replaced not only with the different types of cutting instruments described above, but could be replaced with different sized knife blades that are not constrained by the limits of a multipurpose tool body. Further, knives having a greater range of shapes may be available as replacement blades, such as carpet cutting knife blades which often take a hook-shape or shape of a scythe. Embodiments described herein can be employed in fixed-blade knives and folding knives, as the knife base can fold relative to a handle as it does in the aforementioned embodiment of the knife base with respect to a multipurpose tool.

FIG. 12 illustrates an example embodiment of a folding knife 300 having a replaceable knife blade 320 secured to knife base 310 using fastener 330. The folding knife 300 includes a fastener 350 about which the replaceable knife blade 320 and base 310 fold to be stowed within the handle 340. Similar to the fixed-handle knife illustrated in FIG. 11 and various embodiments described herein, the replaceable knife blade 320 can take various forms of conventional knife shapes and profiles and may include saw teeth, serrations along some or all of the length of the knife blade, and may be scaled to a variety of useful sizes.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A knife comprising:

a knife base defining a recess;

a replaceable knife blade defining a flange, wherein the knife blade defines a plane along which the replaceable knife blade extends; and a fastener;

wherein in an attached position, the recess of the knife base is configured to engage the flange of the replaceable knife blade, and wherein in the attached position, the knife base is configured to be held fixed relative to the replaceable knife blade along an axis orthogonal to the plane defined by the replaceable knife blade by the fastener securing the knife base to the replaceable knife blade, wherein the replaceable knife blade defines a knife blade recess, wherein the knife base defines a protrusion, wherein in the attached position, the protrusion engages the knife blade recess and prevents movement of the replaceable knife blade fixed with respect to the knife base in the plane defined by the replaceable knife blade.

2. The knife according to claim 1, wherein in the attached position, the protrusion engages the knife blade recess to preclude movement of the replaceable knife blade relative to the knife base about the axis orthogonal to the plane defined by the replaceable blade.

3. A knife comprising:

a knife base defining a base protrusion and a base recess;

a replaceable knife blade defining a blade protrusion and a blade recess; and a fastener, wherein the knife base is configured to be held fixed relative to the replaceable knife blade in a plane along which the replaceable knife blade extends in response to the base protrusion engaging the blade recess, and the blade protrusion engaging the base recess, and wherein the knife base is also configured to be held fixed relative to the replaceable knife blade along an axis orthogonal to the plane of the replaceable knife blade by the fastener securing the knife base to the replaceable knife blade.

4. The knife of claim 3, wherein the knife base defines a fastener hole, wherein the replaceable knife blade defines an edge, and wherein the fastener passes through the fastener hole and presses the edge of the replaceable knife blade against the knife base.

5. The knife of claim 3, wherein the replaceable knife blade defines a flange, wherein the knife base defines a recess, and wherein the fastener holds the flange against the recess.

6. The knife of claim 3, wherein the knife base is attached to a handle.

7. The knife of claim 6, wherein the knife base is foldable relative to the handle, wherein the knife base is moveable between a folded position where the replaceable knife blade is concealed within the handle, and a deployed position, where the replaceable knife blade is exposed.

8. The knife of claim 3, wherein the fastener is an axial fastener.

9. The knife of claim 3, wherein the replaceable knife blade is interchangeable with one or more other knife blades of different knife blade profiles.

10. A multipurpose tool comprising the knife of claim 3, wherein the knife base is moveable between a folded position where the replaceable knife blade is concealed within the multipurpose tool, and a deployed position, where the replaceable knife blade is exposed.

11. The knife of claim 3, wherein the fastener is a first fastener, the knife further comprising a second fastener, wherein the knife base is held fixed relative to the replaceable knife blade in an axis orthogonal to the plane of the replaceable knife blade by the first fastener and the second fastener securing the knife base to the replaceable knife blade.

12. A knife comprising:

a knife base; and a replaceable knife blade;

wherein the knife base defines a recess having a first series of curvatures of an interlocking profile, wherein the replaceable knife blade defines a a flange having a second series of curvatures of an interlocking profile, complementary to the first series of curvatures, wherein the second series of curvatures of the interlocking profile fits within the first series of curvatures of the interlocking profile, and wherein the knife is configured such that movement of the knife blade relative to the knife base is precluded in a plane along which the replaceable knife blade extends in response to the second series of curvatures of the interlocking profile engaging within the first series of curvatures of the interlocking profile.

13. The knife of claim 12, further comprising a fastener, wherein the fastener secures the second series of curvatures of the interlocking profile within the first series of curvatures of the interlocking profile.

14. The knife of claim 13, wherein the fastener precludes relative movement between the knife base and the replaceable knife blade.

15. The knife of claim 14, wherein the knife base defines a fastener hole, wherein the replaceable knife blade defines an edge, and wherein the fastener passes through the fastener hole and presses the edge of the replaceable knife blade toward the knife base.

16. The knife of claim 12, wherein the flange precludes the second part of the interlocking profile from passing through the first part of the interlocking profile.

17. A multipurpose tool comprising the knife of claim 12, wherein the knife base is moveable between a folded position where the replaceable knife blade is concealed within the multipurpose tool, and a deployed position, where the replaceable knife blade is exposed.

* * * * *